(12) United States Patent
Okazaki et al.

(10) Patent No.: US 6,645,617 B1
(45) Date of Patent: Nov. 11, 2003

(54) PRESSURE-SENSITIVE ADHESIVE COMPOSITION CURABLE WITH ACTINIC ENERGY RAY AND PRESSURE-SENSITIVE ADHESIVE SHEET

(75) Inventors: Eiichi Okazaki, Aichi (JP); Tetsuji Jitsumatsu, Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 0 days.

(21) Appl. No.: 09/856,984

(22) PCT Filed: Nov. 30, 1999

(86) PCT No.: PCT/JP99/06650

§ 371 (c)(1),
(2), (4) Date: May 30, 2001

(87) PCT Pub. No.: WO00/32710

PCT Pub. Date: Jun. 8, 2000

(30) Foreign Application Priority Data

Nov. 30, 1998 (JP) .......................... 10-355340

(51) Int. Cl.$^7$ ................................. C08F 2/46
(52) U.S. Cl. ............... 428/343; 428/345; 428/355 AC; 522/35; 522/113; 522/114; 522/152; 522/120; 522/121
(58) Field of Search .................... 522/35, 113, 114, 522/120, 121, 152; 428/343, 345, 355 AC

(56) References Cited

U.S. PATENT DOCUMENTS

| | | |
|---|---|---|
| 4,416,975 A | 11/1983 | Green et al. |
| 4,532,332 A | 7/1985 | Müller |
| 4,626,497 A | 12/1986 | Roth et al. |
| 4,629,773 A | 12/1986 | Müller |
| 5,006,621 A | 4/1991 | Wahle et al. |
| 5,171,655 A * | 12/1992 | Aoshima .................... 430/138 |
| 5,852,119 A * | 12/1998 | Kojima et al. ............... 525/123 |
| 6,376,070 B1 * | 4/2002 | Nakasuga et al. ...... 428/355 EP |

FOREIGN PATENT DOCUMENTS

| | | |
|---|---|---|
| EP | 1 043 313 A1 | 10/2000 |
| JP | 06-067417 | 3/1994 |
| JP | 11-140108 | 5/1999 |
| WO | WO 98/58912 | 12/1998 |

* cited by examiner

Primary Examiner—Susan W. Berman
(74) Attorney, Agent, or Firm—Fitch, Even, Tabin & Flannery

(57) ABSTRACT

A pressure-sensitive adhesive composition curable with actinic energy rays which comprises a copolymer comprising 0.1 to 30 wt. %, preferably 0.1 to 3 wt. %, structural units derived from an imide (meth)acrylate represented by general formula (1) and 70 to 99.9 wt. %, preferably 97 to 99.9 wt. %, structural units derived from an ethylenic monomer such as an alkyl (meth)acrylate having a $C_{4-12}$ alkyl group. In formula (1), $R^1$ and $R^2$ each independently is hydrogen or $C_{1-4}$ alkyl, one of $R^1$ and $R^2$ is hydrogen and the other is $C_{1-4}$ alkyl, or $R^1$ and $R^2$ are bonded to each other to form a carbon ring; $R^3$ is $C_{1-6}$ alkylene; $R^4$ is hydrogen or methyl; and n is an integer of 1 to 6. The pressure-sensitive adhesive composition is usable as one-pack type, has excellent storage stability, and does not necessitate any step such as heating or aging when used. The cured article obtained therefrom is excellent in bonding strength and holding power, is substantially odorless, and is extremely suitable for use in pressure-sensitive adhesive sheets, etc.

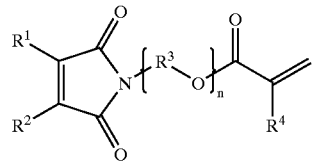

(1)

6 Claims, No Drawings

PRESSURE-SENSITIVE ADHESIVE COMPOSITION CURABLE WITH ACTINIC ENERGY RAY AND PRESSURE-SENSITIVE ADHESIVE SHEET

This application is the National Phase of International Application PCT/JP99/06650, filed Nov. 29, 1999, which designated the U.S. and that international application was not published under PCT Article 21(2) in English.

TECHNICAL FIELD

The present invention relates to a solvent type or emulsion type pressure-sensitive adhesive composition which is curable with active energy beams, and relates to a pressure-sensitive adhesive sheet having a pressure-sensitive adhesive layer formed of the above pressure-sensitive adhesive composition, which can be of great utility in the technical fields utilizing them.

BACKGROUND ART

Hitherto, pressure-sensitive adhesive compositions, particularly solvent type pressure-sensitive acrylic adhesive compositions, comprises acrylic polymers as main components which are often crosslinked for improvement of holding power. For performing the crosslinking, polyisocyanate compounds or the like that rapidly react at room temperature are generally used as crosslinking agents. In many cases, the pressure-sensitive adhesive compositions are coated on substrates and dried to form an adhesive layer, and thus these are used as pressure-sensitive adhesive sheets.

In the conventional pressure-sensitive adhesive compositions of the type of one-pack with which the crosslinking agent has been blended, however, polyisocyanate compounds as the crosslinking agent react at room temperature to cause deterioration of storage stability. Hence, in many cases, the compositions are used in a form of two-pack type according to which the acrylic polymer and the crosslinking agent are handled separately. However, the two-pack compositions still suffer from the problem that coatability is damaged because there are limitations in pot life or in some case the crosslinking partially proceeds before use.

Also, acrylic emulsion type pressure-sensitive adhesive compositions are often used together with crosslinking agents such as water-soluble epoxy resins and made into two-pack type compositions according to applications thereof for the purpose of improving cohesive strength of the adhesives. In this case, after being coated on a substrate, they require a heating step or an aging step for a long period, and thus are hard to produce.

Active energy beam-curable, pressure-sensitive adhesive compositions comprising (meth)acrylates are known as compositions which solve the problems in the conventional pressure-sensitive adhesive compositions. Since the pressure-sensitive compositions are crosslinked and cured by irradiation with active energy beams such as ultraviolet rays, electron beams, etc., they can be used as one-pack type compositions.

However, the compositions have the problem of odor of cured products. In other words, many of the conventional active energy beam-curable, pressure-sensitive adhesive compositions are insufficient in curability and sometimes generate an odor due to unreacted monomers remaining in the cured products. Moreover, when the compositions are cured with ultraviolet rays, a photopolymerization initiator must be added to the compositions. Even if the compositions curable with ultraviolet rays are excellent in curability, decomposition product of the photopolymerization initiator remains in the cured products and hence the cure products have an odor.

The inventors have conducted intensive researches in an attempt to find pressure-sensitive adhesive compositions and adhesive sheets which can be used as one-pack type, are excellent in storage stability, require no step for heating, aging or the like, and can give cured products that are excellent in adhesion and odorless.

DISCLOSURE OF INVENTION

As a result of various investigations, the inventors have found that a composition containing a copolymer having an imide (meth)acrylate of a specific structure as a constitutional monomer unit has excellent curability upon irradiation with ultraviolet rays without addition of a photopolymerization initiator or with addition of a small proportion of photopolymerization initiator and provides a cured product thereof which is substantially odorless, and besides the composition requires no steps such as for heating and aging, and is excellent in performance as a pressure-sensitive adhesive. Thus, the present invention has been accomplished.

The present invention will be explained in detail below.

In this specification, acrylate or methacrylate is called (meth)acrylate, and acrylic acid or methacrylic acid is called (meth)acrylic acid.

BEST MODE FOR CARRYING OUT THE INVENTION IMIDE (METH)ACRYLATE

The copolymer used in the composition of the present invention is a copolymer containing an imide (meth)acrylate represented by the following formula (1) (hereinafter referred to as merely "imide (meth)acrylate") as a constitutional monomer unit.

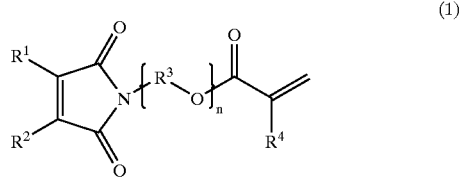

(1)

In the above formula (1), $R^1$ and $R^2$ each independently is a hydrogen atom or an alkyl group of 4 or less carbon atoms, one of $R^1$ and $R^2$ is a hydrogen atom whilst another is an alkyl group of 4 or less carbon atoms, or $R^1$ and $R^2$ are bonded to each other to form a carbon ring; $R^3$ is an alkylene group of 1–6 carbon atoms; $R^4$ is a hydrogen atom or a methyl group; and n is an integer of 1–6.

In the above formula (1), n is preferably 1–2, more preferably 1 because the resulting copolymer is superior in curability.

Preferably, $R^1$ and $R^2$ each independently is an alkyl group of 4 or less carbon atoms or $R^1$ and $R^2$ are bonded to each other to form a carbon ring because of superior copolymerizability with an ethylenically unsaturated group-containing monomer. It is further preferred that $R^1$ and $R^2$ are bonded to each other to form a carbon ring, more preferably a group —$CH_2CH_2CH_2$— or a group —$CH_2CH_2CH_2CH_2$—, especially preferably a group —$CH_2CH_2CH_2CH_2$— because the imide (meth)acrylate is easy to produce with high yield, and the resulting copolymer is superior in water resistance.

$R^3$ is an alkylene group of 1–6 carbon atoms, preferably an ethylene group, a propylene group or the like.

Preferable examples of imide (meth)acrylate include compounds represented by the following formula (2) and formula (3).

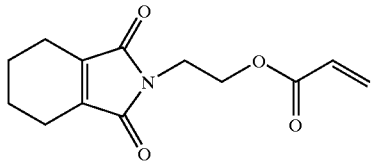

The compounds of the formula (2) are those of the formula (1) where $R^1$ and $R^2$ are boned to each other and represented by a group —$CH_2CH_2CH_2CH_2$— to form a carbon ring, $R^3$ is an ethylene group, $R^4$ is a hydrogen atom, and n is 1.

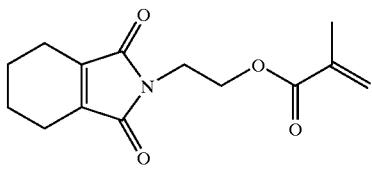

The compounds of the formula (3) are those of the formula (1) where $R^1$ and $R^2$ are bonded to each other and represented by a group —$CH_2CH_2CH_2CH_2$— to form a carbon ring, $R^3$ is an ethylene group, $R^4$ is a methyl group, and n is 1.

The imide (meth)acrylate can be produced from an acid anhydride, an amino alcohol and a (meth)acrylic acid by the processes disclosed in the following literatures and patent publications.

Kiyoshi Kato et al, "Journal of Synthetic Organic Chemistry Association (Yukigoseikagaku Kyokai-shi)", 30 (10), 897, (1972).

Javier de Abajo et al, "Polymer", vol.33 (5), (1992).

JP-A-56-53119

JP-A-1-242569

As the acid anhydride used as a starting material, mention may be made of 3,4,5,6-tetrahydrophthalic anhydride and derivatives thereof and dialkylmaleic anhydrides and derivatives thereof. Because of giving high yields, 3,4,5,6-tetrahydrophthalic anhydride and derivatives thereof are preferred.

Examples of the amino alcohol used as a starting material are alkanolamines such as ethanolamine, propanolamine and butanolamine, 2,2'-aminoethoxyethanol and the like.

Copolymers

The copolymers used in the present invention comprise 0.1–30% by weight of an imide (meth)acrylate and 70–99.9% by weight of an ethylenically unsaturated group-containing monomer (hereinafter referred to as "unsaturated monomer") preferably 0.1–3% by weight of an imide (meth) acrylate and 97–99.9% by weight of an unsaturated monomer as constitutional monomer units. Since the copolymers used in the present invention have the maleimide group represented by the formula (1), they are readily cured with active energy beams, and besides even when they are cured with ultraviolet rays, they show excellent curability without addition of photopolymerization initiators or with addition of a small amount of photopolymerization initiators, and the crosslinked, cured products thereof provide pressure-sensitive adhesives having excellent properties. Furthermore, in case the copolymerization ratio of the imide (meth)acrylate is relatively great, namely, 10–30% by weight, the cured products are useful in weak adhesion.

If the copolymerization ratio is less than 0.1% by weight, cohesive strength deteriorates because of low crosslinking density of the cured product of the composition. If the ratio exceeds 36% by weight, adhesion deteriorates because the crosslinking density of the cured product of the composition becomes too high, and the cured product becomes too hard.

The unsaturated monomers include, for example, (meth)acrylates other than imide (meth)acrylates; unsaturated carboxylic acids; vinyl esters; conjugated diene monomers; cyano group-containing vinyl monomers such as (meth)acrylonitrile and α-chloroacrylonitrile; compounds containing a halogenated ethylenically unsaturated group such as vinyl chloride and vinylidene chloride; monoalkyl esters of unsaturated dicarboxylic acids such as monoethyl itaconate, monobutyl fumarate and monobutyl maleate; allyl alcohol; and aromatic compounds containing an ethylenically unsaturated group such as styrene and α-methylstyrene.

Examples of the (meth)acrylates other than imide (meth)acrylates are alkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, n-hexyl (meth)acrylate, n-octyl (meth)acrylate, i-octyl (meth)acrylate, 2-ethylhexyl (meth)acrylate, n-nonyl (meth)acrylate, i-nonyl (meth)acrylate, n-decyl (meth)acrylate and n-lauryl (meth)acrylate; hydroxyl group-containing (meth)acrylates such as 2-hydroxyethyl (meth)acrylate, 2-hydroxypropyl (meth)acrylate, 2-hydroxy-3-phenoxypropyl (meth)acrylate, glycerol mono(meth)acrylate, polyethylene glycol mono(meth)acrylate, polypropylene glycol mono(meth)acrylate and mono(meth)acrylate of polyethylene glycol-polypropylene glycol copolymer; epoxy group-containing (meth)acrylates such as glycidyl (meth)acrylate; and (meth)acrylamides such as (meth)acrylamide, N-methylol (meth)acrylamide, N-methoxymethyl(meth)acrylamide and N-methoxybutyl (meth)acrylamide.

Examples of the unsaturated carboxylic acids are (meth)acrylic acid, crotonic acid, maleic acid, fumaric acid, itaconic acid, citraconic acid, cinnamic acid and maleic anhydride. Of these, (meth)acrylic acid is preferred because this is inexpensive and gives pressure-sensitive adhesives excellent in performance.

Examples of the vinyl esters are vinyl acetate, vinyl propionate, vinyl butyrate, vinyl pivalate, vinyl laurate and vinyl versatate. Of these, vinyl acetate is preferred.

Examples of the conjugated diene monomers are butadiene, isoprene, chloroprene and isobutylene.

These unsaturated monomers may be used in combination of two or more.

As for preferred combinations of the imide (meth)acrylate and the unsaturated monomer in the copolymer, there are copolymers comprising an imide (meth)acrylate and an alkyl (meth)acrylate, copolymers comprising an imide (meth)acrylate, ethylene and a vinyl ester, copolymers comprising an imide (meth)acrylate and a conjugated diene monomer, and the like. Among them, copolymers comprising an imide (meth)acrylate and an alkyl (meth)acrylate are preferred because they are superior in adhesion.

In order for the composition of the present invention to be excellent in holding power and adhesive strength, the copolymer preferably comprises, as constitutional monomer units, an imide (meth)acrylate, an alkyl (meth)acrylate having an alkyl group of 4–12 carbon atoms and, if necessary, other monomers copolymerizable with these monomers (which are hereinafter referred to as "other copolymerizable monomers"), and more preferably the copolymer has an alkyl (meth)acrylate having an alkyl group of 4–9 carbon atoms as the alkyl (meth)acrylate because this is superior in copolymerizability with the imide (meth)acrylate and the resulting pressure-sensitive adhesive compositions are especially excellent in adhesive strength.

Examples of the other copolymerizable monomers are unsaturated carboxylic acids, alkyl (meth)acrylates having an alkyl group of 1–3 carbon atoms, cyano group-containing vinyl monomers, hydroxyl group-containing (meth)acrylates, monoalkyl esters of unsaturated dicarboxylic acids, allyl alcohol, (meth)acrylamides, vinyl acetate, glycidyl (meth)acrylate, vinyl chloride and vinylidene chloride.

Among them, unsaturated carboxylic acids are preferred because the resulting pressure-sensitive adhesive compositions are especially excellent in holding power.

The copolymerization ratio of the copolymers is preferably 0.1–30% by weight of the imide (meth)acrylate, 70–99.9% by weight of the alkyl (meth)acrylate having an alkyl group of 4–12 carbon atoms and 0–50% by weight of the other copolymerizable monomer. If the copolymerization ratio of the imide (meth)acrylate is less than 0.1% by weight or that of the alkyl (meth)acrylate exceeds 99.9% by weight, cohesive strength of the resulting adhesives is sometimes deteriorated to cause decrease of holding power. If the copolymerization ratio of the imide (meth)acrylate exceeds 30% by weight or that of the alkyl (meth)acrylate is less than 70% by weight, it sometimes becomes difficult to balance adhesive strength, holding power and tackiness of the resulting pressure-sensitive adhesives. If the copolymerization ratio of the other copolymerizable monomer exceeds 50% by weight, adhesive strength is sometimes deteriorated.

In the case of copolymerizing the unsaturated carboxylic acid, its copolymerization ratio is preferably 0.1–10% by weight.

If the copolymerization ratio of the unsaturated carboxylic acid is less than 0.1% by weight, holding power and bonding strength of the resulting adhesives are sometimes insufficient, and if the copolymerization ratio of the unsaturated carboxylic acid exceeds 10% by weight, tackiness and adhesion of the resulting adhesives are sometimes deteriorated.

In the case of the solvent type pressure-sensitive adhesive composition, molecular weight of the copolymer is preferably 10,000–1,000,000, more preferably 100,000–1,000,000 in terms of weight-average molecular weight. If the weight-average molecular weight of the copolymer is less than 10,000, adhesion is sometimes deteriorated, and if it exceeds 1,000,000, viscosity of the composition sometimes becomes too high, causing deterioration of coatability.

In the present invention, the weight-average molecular weight is a value obtained by measuring a molecular weight by gel permeation chromatography (hereinafter referred to as "GPC") using tetrahydrofuran as a solvent and carrying out conversion on the basis of the molecular weight of polystyrene.

Furthermore, in the composition of the present invention, glass transition temperature of the copolymer is preferably not higher than −20° C., more preferably not higher than −30° C. If the glass transition temperature of the copolymer is higher than −20° C., pressure-sensitive adhesives are apt to be insufficient in tackiness.

Method for Producing the Copolymer

The copolymer used in the present invention can be produced by various methods, and can be those obtained by polymerizing the above monomers according to conventional methods including, for example, solution polymerization, emulsion polymerization and suspension polymerization.

When the solution polymerization method is employed, as a specific method, mention may be made of a method which comprises dissolving starting monomers in an organic solvent and stirring the solution with heating in the presence of a thermal radical polymerization initiator.

When the emulsion polymerization method is employed, as specific methods, mention may be made of a method which comprises dispersing starting monomers in an aqueous medium using an emulsifier and stirring the dispersion with heating in the presence of a thermal radical polymerization initiator and a method which comprises dispersing starting monomers in an aqueous medium using an emulsifier to prepare an aqueous emulsion and adding the aqueous emulsion to an aqueous medium under stirring with heating in the presence of a thermal radical polymerization initiator.

In any of the above methods, if necessary, a chain transfer agent can be used to adjust molecular weight of the copolymer. Moreover, if necessary, there may be optionally added thickening agents, crosslinking agents, preservatives, rust preventing agents, pigments, plasticizers, wetting agents, fillers, anti-freezing agents, high-boiling solvents, anti-foaming agents, etc.

Examples of the organic solvents are benzene, toluene, ethyl acetate, methanol and dimethylformamide.

The thermal radical polymerization initiators include, for example, peroxides, persulfate compounds, azo compounds and redox initiators which produce radicals with heat. Examples of the peroxides are benzoyl peroxide, lauroyl peroxide, cumene hydroperoxide, t-butyl hydroperoxide and dicumyl peroxide. Examples of the persulfate compounds are ammonium persulfate, potassium persulfate and sodium persulfate. Examples of the azo compounds are azobisisobutyronitrile and azobis-2,4-dimethylvaleronitrile. Examples of the redox initiators are hydrogen peroxide-iron (II) salt, peroxodisulfate-sodium hydrogensulfite and cumene hydroperoxide-iron (II) salt.

Examples of the chain transfer agents are dodecylmercaptan, xanthogenic acid disulfide, diazothioether and 2-propanol.

Active Energy Beam-curable Pressure-sensitive Adhesive Composition

The active energy beam-curable, pressure-sensitive adhesive composition of the present invention comprises the above-mentioned copolymer and may be used in a form of either solution in organic solvent or emulsion.

Proportion of the copolymer in the pressure-sensitive adhesive composition is such that the copolymer comprises preferably 30–80% by weight, more preferably 45–80% by weight of the composition.

The proportion of the copolymer in the solvent type pressure-sensitive adhesive composition is preferably such that the composition is given a viscosity of 50–20000 cps measured by a Brookfield viscometer under the conditions of 25° C. and 12 rpm because this composition is superior in coatability.

The composition of the present invention may contain compounds having a reactive unsaturated group for increasing adhesive performance of the cured product or for adjusting sensitivity of the composition.

The compounds having a reactive unsaturated group include, for example, acrylic monomers and oligomers.

Examples of the acrylic monomers are hydroxyalkyl (meth)acrylates such as 2-hydroxyethyl (meth)acrylate and 2-hydroxypropyl (meth)acrylate; acrylates of alkylene oxide adducts of phenols and halogen-nuclear substituted products thereof such as phenoxyethyl (meth)acrylate; mono- or di-(meth)acrylates of glycols such as mono- or di-(meth) acrylate of ethylene glycol, mono(meth)acrylate of methoxyethylene glycol, mono- or di(meth)acrylate of tetraethylene glycol and mono- or di(meth)acrylate of tripropylene glycol; and (meth)acrylates of polyols and their alkylene oxide adducts such as trimethylolpropane tri(meth)acrylate, pentaerythritol tri(meth)acrylate, pentaerythritol tetra(meth)acrylate and dipentaerythritol hexacrylate.

The acrylic oligomers include, for example, urethane (meth)acrylate oligomers, polyester (meth)acrylate oligomers and epoxy (meth)acrylate oligomers.

The urethane (meth)acrylate oligomers include, for example, reaction products of polyols and organic polyisocyanates, followed by reaction with hydroxyl group-containing (meth)acrylates. The polyols include, for example, low-molecular weight polyols, polyethylene glycols and polyester polyols. Examples of the low-molecular weight polyols are ethylene glycol, propylene glycol, cyclohexane dimethanol and 3-methyl-1,5-pentanediol, examples of the polyether polyols are polyethylene glycol and polypropylene glycol, and examples of the polyester polyols are reaction products of these low-molecular weight polyols and/or polyether polyols with acid components such as dibasic acids including adipic acid, succinic acid, phthalic acid, hexahydrophthalic acid and terephthalic acid or anhydrides thereof. Examples of the organic polyisocyanates are tolylene diisocyanate, 4,4'-diphenylmethane diisocyanate, 4,4'-dicyclohexylmethane diisocyanate, hexamethylene diisocyanate and isophorone diisocyanate. Examples of the hydroxyl group-containing (meth)acrylates are hydroxyalkyl (meth)acrylates such as 2-hydroxyethyl (meth)acrylate and 2-hydroxypropyl (meth)acrylate.

The polyester (meth)acrylate oligomers include dehydration condensates of polyester polyols and (meth)acrylic acid. Examples of the polyester polyols are reaction products of low-molecular weight polyols such as ethylene glycol, polyethylene glycol, cyclohexanedimethanol, 3-methyl-1,5-pentanediol, propylene glycol, polypropylene glycol, 1,6-hexanediol and trimethylolpropane and alkylene oxide adducts thereof with acid components such as dibasic acids including adipic acid, succinic acid, phthalic acid, hexahydrophthalic acid and terephthalic acid or anhydrides thereof.

The epoxy acrylates are addition reaction products of epoxy resins with unsaturated carboxylic acids such as (meth)acrylic acid, and examples thereof are epoxy (meth)acrylates of bisphenol A type epoxy resins, epoxy (meth)acrylates of phenol or cresol novolak type epoxy resins and addition reaction products of diglycidyl ether of polyethers with (meth)acrylic acid.

Addition amount of the compound having a reactive unsaturated group is preferably not more than 50 parts by weight, more preferably not more than 20 parts by weight based on 100 parts by weight of the copolymer.

The composition of the present invention is crosslinked and cured by irradiation with active energy beams, and since the copolymer has a maleimide group as mentioned above, the composition is readily cured with active energy beams. Even when the composition is cured with ultraviolet rays, the composition has an excellent curability without addition of photopolymerization initiators or with addition of a small amount of photopolymerization initiators.

When a photopolymerization initiator is added, examples thereof are benzoin and alkyl ethers thereof, acetophenones, anthraquinones, thioxanthones, ketals, benzophenones and xanthones. Examples of photosensitizers are benzoic acid type and amine type photosensitizers. These may be used in admixture of two or more. Addition amount of them is preferably 0.01–10 parts by weight based on 100 parts by weight of the copolymer, or based on 100 parts by weight of the total amount of the copolymer and the compound having a reactive unsaturated group in case the latter is added.

Furthermore, the composition can contain general additives such as anti-foaming agent, thickening agent, lubricant, film-forming aid, fiber aid, detergent, antistatic agent, leveling agent, wetting agent and leveling improver depending on uses.

The composition of the present invention can contain a tackifier for enhancing sticking performance of cured products. As the tackifier, there may be used various ones, for example, natural resins such as rosin resins and terpene resins and derivative thereof and synthetic resins such as petroleum resins.

Method of Using the Pressure-sensitive Adhesive Composition

The composition of the present invention can be used according to the methods which have been conventionally used for active energy beam-curable, pressure-sensitive adhesive compositions.

For example, there is a method which comprises coating the composition of the present invention on the surface of a paper, plastic film, metallic foil or the like as a web or substrate by conventional methods such as roll coating, die coating and knife coating, drying the coat and then irradiating the coat with active energy beams to cure the coat.

Coating amount of the composition of the present invention can also be optionally selected depending on the use, and is preferably 5–200 g/m$^2$, more preferably 10–100 g/m$^2$.

The active energy beams include ultraviolet rays, X-rays, electron beams and the like, and ultraviolet rays are preferably used since inexpensive devices can be employed. As light sources for curing with ultraviolet rays, there may be used various sources such as high pressure mercury lamps, metal halide lamps, xenon lamps, electrodeless discharge lamps and carbon arc lamps.

As the uses of the composition of the present invention, mention may be made of bonding of substrates used for deflector plates, liquid crystal display, optical parts, watch parts, composite materials, laminated glass, multi-layer glass, and the like because the composition has an excellent holding power.

The composition of the present invention can be suitably used for preparation of pressure-sensitive adhesive sheets because its cured product is excellent in holding power and adhesive strength as aforementioned.

As the substrates when the composition of the present invention is used for pressure-sensitive adhesive sheets, mention may be made of, for example, paper, cellophane, polypropylene, polyethylene, polyester, fluorocarbon resin, polystyrene, polyimide, polyacetate, polyvinyl chloride, glass, acrylic resin, methacrylic resin, polycarbonate, polyethylene terephthalate, polyethylene naphthalate, liquid crystal polymer, polyether sulfone, ethylene-vinyl alcohol resin and urea-melamine resin.

For producing the pressure-sensitive sheet, conventional methods can be employed, and the sheet can be produced by coating the composition on the substrate, drying the coat, and then irradiating the coat with active energy beams. The coating method, the coating amount and the irradiation conditions of active energy beams can be the same as those mentioned above.

The pressure-sensitive adhesive sheets can be applied to pressure-sensitive adhesive labels, pressure-sensitive adhesive tapes, special pressure-sensitive adhesive films, and the like.

Examples of the pressure-sensitive adhesive labels are those for indication of goods such as trademark labels, quality indication labels, content indication labels, returnable labels, and name plates; those for indication of prices, such as weight labels, hand labels, price tags, and price marks; those for explanation and guarantee such as instruction labels, test certificate labels, guarantee labels, indelible labels, distribution figure labels, scale plate labels and PL law warning labels; those for propaganda and sales promotion such as stickers (for windows, vehicles, stores, etc.), marking and decorative labels, stamps, seals, badges, posters and multi-layer labels; those for control such as register slip labels, computer labels, POS labels and process and stock control labels; those for baggage address such as double- and single-side baggage labels, address labels and home delivery slip labels; those for sealing such as seals and cap seals; those for guiding and signing such as directional sign labels, traffic-control sign labels and facilities sign labels; those for recycling such as toiletry-related labels, appliance labels and OA apparatus labels; those for index labels (for stationary, video cassettes, floppy disks); those for color sample labels; those for toys (seals); and those for teaching materials.

Examples of the pressure-sensitive adhesive tapes are those for surface protection such as for name plate tapes, metallic construction materials and automobile tapes; those for electric and electronic equipment such as semiconductor producing process tapes, electronic parts transportation tapes, protecting and masking tapes, fixing and adhering tapes, electric insulation tapes, banding and repairing tapes and electrically conductive tapes; those for indication and sealing on EPS (expanded polystyrene beads fused articles) cases; those for general masking such as coating painting masking tapes and cure masking tapes; those for sealing and packaging such as corrugated board packaging tapes; those for office works; those for automobile decorative tapes; those for photoengraving tapes; those for splicing tapes; and those for general banding and fixing such as double-sided tapes and cellophane tapes, OPP tapes.

Examples of the special pressure-sensitive adhesive films are those for outdoor endurance such as outdoor advertising films, automobile stripes and marking films; those for general wall decoration such as posters, interior films and interior materials; those for interior decoration such as elevator interior films, counter decoration films, house furnishing decoration films, vehicle interior films, automatic vending machine decorative films, cashing corner decorative films and table decorative films; those for short-term decoration such as window display films, stickers and marking films; those for internal illumination signboards such as outdoor endurance films; those for sunlight shielding and scattering prevention films for building; those for safety reflective films (for automobiles, shoes, helmets); those for window films to be applied to automobiles with wetting with water or soapy water; and those for prisms, hologram films, light storing films and luminous films.

The pressure-sensitive adhesive composition of the present invention is excellent in storage stability, needs no aging steps such as heating and usable as one-pack type composition since the copolymer which is a constitutional component has no reactivity at room temperature in the dark unlike the conventional two-pack type compositions such as solvent type pressure-sensitive adhesives which use polyisocyanate compounds as crosslinking agents which react at room temperature or emulsion type pressure-sensitive adhesives which use crosslking agents and need an aging step.

Furthermore, in the pressure-sensitive adhesive composition of the present invention, maleimide groups in the copolymer cause crosslinking reaction between molecules by irradiation with active energy beams and, as a result, the composition develops a very high holding power. In addition, by changing the proportion of the copolymer of imide (meth)acrylate depending on purposes, the balance between holding power and adhesive strength can easily be adjusted. It is known in JP-A-52-988 and JP-A-55-160010 that copolymers having maleimide groups bring about a crosslinking reaction upon irradiation with ultraviolet rays. However, these patent publications make no mention of uses as pressure-sensitive adhesives, and according to the present invention, it has been found that a composition containing a copolymer having a maleimide group can be used as pressure-sensitive adhesives, and especially suitably used for pressure-sensitive adhesive sheets.

Moreover, the composition of the present invention is easily cured with active energy beams, and even in the case of curing the composition with ultraviolet rays, it has an excellent curability without addition of photopolymerization initiators or with addition of a small amount of photopolymerization initiators. It is known in Sonny Jonsson et al, the collection of the preliminary lectures "Academic Days", p.34 (Radtech '95 Europe) that maleimide groups cause a hydrogen drawing reaction to produce radicals by irradiation of ultraviolet rays. By the same mechanism, the maleimide groups of the copolymer in the present invention also produce radicals even without addition of photopolymerization initiators, so that the maleimide groups cause a crosslinking reaction between them. For this reason, the composition of the present invention has an excellent curability without addition of photopolymerization initiators or with addition of a small amount of photopolymerization initiators.

EXAMPLES

Hereinafter, the present invention will be explained in more specifically by the following examples and comparative examples. In the examples and the comparative examples, "part" means "part by weight" and "%" means "% by weight".

The abbreviations of monomers used have the following meanings.

HA: 2-Ethylhexyl acrylate
BA: Butyl acrylate
HEA: 2-Hydroxyethyl acrylate
AA: Acrylic acid
TPGDA: Tripropylene glycol diacrylate Example 1

1) Preparation of Pressure-sensitive Adhesive Composition 0.5 Grams of the compound of the formula (2), 94.0 g of BA, 5.0 g of AA, 0.5 g of HEA, 100 g of butyl acetate, and 0.5 g of 2,2'-azobis(2-methylbutyronitrile) (hereinafter referred to as "AMBN") as a polymerization initiator were charged in a flask equipped with a stirrer, a thermometer and a condenser at room temperature and were homogeneously dissolved. Then, the content was heated and stirred at 85° C. for 2 hours and at 95° C. for 1 hour.

The resulting copolymer solution had a solid content of 50%, a number-average molecular weight of 52000 and a weight-average molecular weight of 140000.

The resulting copolymer solution was a pressure-sensitive adhesive composition and referred to as adhesive a1.

2) Production of Pressure-sensitive Adhesive Sheet

The composition a1 was coated on the surface of a polyethylene terephthalate film of 25 $\mu$m thick so that thickness of the adhesive layer after dried became 20 μm, and then the coat was dried at 100° C. for 120 seconds by a hot air circulating dryer.

Then, the film was passed twice under a condensing type high-pressure mercury lamp of 120 W/cm (one lamp at a height of 10 cm) at a conveyor speed of 5 m/min to irradiate the composition-coated side with ultraviolet rays, thereby obtaining a pressure-sensitive adhesive sheet.

The resulting pressure-sensitive adhesive sheet was evaluated on adhesive strength, holding power, tackiness and odor. The results are shown in Table 1.

Pressure-sensitive adhesive sheets were produced in the same manner as in Example 1 using the resulting compositions and were evaluated in the same manner as in Example 1. The results are shown in Table 2.

The pressure-sensitive adhesive compositions of Examples 2–5 were superior in all of adhesive strength, holding power and tackiness, and, besides, the cured coating film had no odor.

TABLE 1

| Adhesive | Monomer | | | | | | Butyl acetate | AMBN | Solid content (%) | Mn *10³ | Mw *10³ |
| | (2)[1] | (3)[2] | BA | HA | HEA | AA | | | | | |
|---|---|---|---|---|---|---|---|---|---|---|---|
| a1 | 0.5 | | 94.0 | | | 0.5 | 5.0 | 100 | 0.5 | 50 | 52 | 140 |
| a2 | | 1.5 | 93.0 | | | 0.5 | 5.0 | 100 | 0.5 | 50 | 45 | 128 |
| a3 | 4.0 | | | | 90.5 | 0.5 | 5.0 | 100 | 0.5 | 50 | 40 | 145 |
| a4 | 5.0 | | 92.0 | | | | | 100 | 0.5 | 50 | 40 | 160 |
| a5 | 15.0 | | 79.5 | | | 0.5 | 5.0 | 100 | 0.5 | 50 | 46 | 135 |

[1](2): Imide acrylate represented by the formula (2).
[2](3): Imide acrylate represented by the formula (3).

The pressure-sensitive adhesive composition of Example 1 was superior in all of adhesive strength, holding power and tackiness, and, besides, the cured coating film had no odor.

Adhesive Strength

Using the above pressure-sensitive adhesive sheet and a stainless steel plate as an adherend, 180° peeling strength was measured in accordance with JIS Z-0237 under the conditions of 23° C., 65%RH.

Holding power

The above pressure-sensitive adhesive sheet was applied to a stainless steel plate so as to give an adhesion area of 25 mm×25 mm, and a load of 1 kg was applied thereto at 40° C. Then, the time before the pressure-sensitive adhesive sheet peeled off was measured. The holding time obtained was taken as holding power.

When the sheet was held after 48 hours at 40° C., a load of 1 kg was separately applied at 80° C., and the time before the sheet peeled off was measured and this was taken as holding power.

When the sheet was held after 48 hours at 80° C., the holding time at 80° C. was indicated as 48 hours or more, and a shifting width from the initial application position was measured and this was shown together.

Tackiness

This was measured using the above pressure-sensitive adhesive sheet in accordance with the bowling method of JIS Z-0237 under an atmosphere of 23° C., 65%RH.

Odor:

The pressure-sensitive adhesive sheet was smelled and the odor of the remaining monomer was evaluated.

○: It has no odor.

Δ: It has a slight odor.

X: It has considerable odor.

Examples 2–5

Copolymers were prepared in the same manner as in Example 1, except that the monomers as shown in Table 1 were used. The resulting solutions of the copolymers were used as pressure-sensitive adhesive compositions.

Example 6

100 Parts of the copolymer solution obtained in Example 1 was mixed with 2.5 parts of TPGDA and 0.25 part of benzyl dimethyl ketal to prepare a pressure-sensitive adhesive composition. This was referred to as adhesive a6.

A pressure-sensitive adhesive sheet was produced in the same manner as in Example 1 using the adhesive a6 and was evaluated in the same manner as in Example 1. The results are shown in Table 2.

The pressure-sensitive adhesive composition of Example 6 was superior in all of adhesive strength, holding power and tackiness, and, besides, the cured coating film had no odor.

Example 7

A pre-emulsion was prepared using 40 g of water, 4 g of dodecylbenzenesulfonic acid (NEOPELEX No. 25 (trade name) manufactured by Kao co., Ltd.) and the same monomers as in Example 1.

48 Grams of water was charged in a flask equipped with a stirrer, a thermometer, a condenser and a dropping funnel, and heated to 80° C. after the atmosphere in the reaction vessel was replaced with nitrogen. Then, 0.1 g of ammonium persulfate was added thereto, followed by adding 0.5% of said pre-emulsion to initiate the polymerization. After confirming that the polymerization was initiated, the remainder of the pre-emulsion (99.5% of the total amount) and 3 g of 10% ammonium persulfate were continuously added dropwise over a period of 4 hours with keeping the polymerization temperature at 79–81° C. After completion of the addition, the product was further kept at 80° C. for 2 hours to complete the reaction.

The thus obtained copolymer emulsion was neutralized with 25% aqueous ammonia, and the viscosity was adjusted to 10,000 cps using an alkali-soluble type thickening agent (B-500 (trade name) manufactured by Toagosei co., Ltd.) to obtain a pressure-sensitive adhesive composition. This pressure-sensitive adhesive composition had a solid content of 51.2% and a pH of 7.2. This was referred to as adhesive a7.

A pressure-sensitive adhesive sheet was produced in the same manner as in Example 1 using the adhesive a7 and was evaluated in the same manner as in Example 1. The results are shown in Table 2.

The pressure-sensitive adhesive composition of Example 7 was superior in all of adhesive strength, holding power and tackiness, and, besides, the cured coating film had no odor.

The pressure-sensitive adhesive composition of comparative Example 4, in which a copolymer having a copolymerization ratio of imide acrylate higher than the upper limit of the present invention was used, caused no odor of the cured coating film, but was inferior in adhesive strength and

TABLE 2

| Example | Adhesive | Adhesive strength (gf/inch) | Holding power | | Tack | Odor |
|---|---|---|---|---|---|---|
| | | | 40° C. | 80° C. Shifting width | | |
| 1 | a1 | 770 | >48 hr | >48 hr  No shifting | 5 | ○ |
| 2 | a2 | 488 | >48 hr | >48 hr  No shifting | 5 | ○ |
| 3 | a3 | 333 | >48 hr | >48 hr  No shifting | 4 | ○ |
| 4 | a4 | 302 | >48 hr | >48 hr  No shifting | 4 | ○ |
| 5 | a5 | 105 | >48 hr | >48 hr  No shifting | 3 | ○ |
| 6 | a6 | 705 | >48 hr | >48 hr  No shifting | 5 | ○ |
| 7 | a7 | 620 | >48 hr | >48 hr  No shifting | 5 | ○ |

Comparative Examples 1 and 2

Pressure-sensitive adhesive sheets were produced in the same manner as in Example 1, except that the pressure-sensitive adhesive compositions obtained in Examples 2 and 3 (adhesive a2 and adhesive a3) were used and the composition coated on the surface of the polyethylene terephthalate film and dried was not irradiated with ultraviolet rays.

The resulting pressure-sensitive adhesive sheets were evaluated in the same manner as in Example 1. The results are shown in Table 4.

The compositions of comparative Examples 1 and 2 were superior in adhesive strength and tackiness, but inferior in tackiness. It is considered that the film was high in cohesive strength due to the effect of the imide acrylate, but owing to the low adhesion strength to the stainless steel plate, the film peeled off just after application of load and the measured value of the holding power was low.

The pressure-sensitive adhesive composition of comparative Example 5, in which a copolymer comprising no imide acrylate was used, was superior in adhesive strength and tackiness, but was inferior in holding power and furthermore the cured coating film had an odor resulting from unreacted monomers in the copolymer.

TABLE 3

| Adhesive | Monomer | | | | | | Butyl acetate | AMBN | Solid content (%) | Mn *10³ | Mw *10³ |
|---|---|---|---|---|---|---|---|---|---|---|---|
| | (2)[1] | (3)[2] | BA | HA | HEA | AA | | | | | |
| b1 | 0.5 | | 94.5 | | 0.5 | 5.0 | 100 | 0.5 | 50 | 47 | 111 |
| b2 | 35.0 | | 59.5 | | 0.5 | 5.0 | 100 | 0.5 | 50 | 45 | 154 |
| b3 | | | 94.5 | | 0.5 | 5.0 | 100 | 0.5 | 50 | 40 | 109 |

[1](2): Imide acrylate represented by the formula (2).
[2](3): Imide acrylate represented by the formula (3).

Comparative Examples 3–5

Copolymers were prepared in the same manner as in Example 1, except that the monomers shown in Table 3 were used, and the resulting copolymer solutions were used as pressure-sensitive adhesive compositions.

Pressure-sensitive adhesive sheets were produced in the same manner as in Example 1 using the above compositions and were evaluated in the same manner as in Example 1. The results are shown in Table 4.

The pressure-sensitive adhesive composition of comparative Example 3, in which a copolymer having a copolymerization ratio of imide acrylate lower than the lower limit of the present invention was used, was superior in adhesive strength and tackiness, but inferior in holding power, and the cured coating film had an odor resulting from unreacted monomers in the copolymer.

holding power, and, furthermore, the cured coating films had an odor resulting from unreacted monomers of the copolymers.

Comparative Example 6

A pressure-sensitive adhesive sheet was produced in the same manner as in Example 1, except that the pressure-sensitive adhesive composition obtained in comparative Examples 5 (adhesive b3) was used and the composition coated on the surface of the polyethylene terephthalate film and dried was not irradiated with ultraviolet rays.

The resulting pressure-sensitive adhesive sheet was evaluated in the same manner as in Example 1. The results are shown in Table 4.

The pressure-sensitive adhesive composition of comparative Example 6 was superior in adhesive strength and tackiness, but inferior in holding power, and, furthermore, the coating film had an odor resulting from unreacted monomers in the copolymer.

Comparative Example 7

100 Parts of the copolymer solution obtained in comparative Example 5 was mixed with 0.25 part of benzyl dimethyl ketal to prepare a pressure-sensitive adhesive composition. This was referred to as adhesive b4.

A pressure-sensitive adhesive sheet was produced in the same manner as in Example 1 using the adhesive b4 and was evaluated in the same manner as in Example 1. The results are shown in Table 4.

The pressure-sensitive adhesive composition of comparative Example 7 was superior in adhesive strength and tackiness, but was inferior in holding power and, besides, the cured coating film had a strong odor resulting from unreacted monomers and decomposed substances of the photopolymerization initiator in the copolymer.

TABLE 4

| Comparative Example | Adhesive | Adhesive strength (gf/inch) | Holding power 40° C. | 80° C. | Shifting width | Tack | Odor |
|---|---|---|---|---|---|---|---|
| 1* | a2 | 607 | 1 min or less | — | — | 7 | Δ |
| 2* | a3 | 455 | 1 min or less | — | — | 6 | X |
| 3 | b1 | 647 | 1 min or less | — | — | 4 | Δ |
| 4 | b2 | 10 | 1 min or less | — | — | <2 | ○ |
| 5 | b3 | 655 | 1 min or less | — | — | 7 | Δ |
| 6* | b3 | 567 | 3 min | — | — | 7 | Δ |
| 7 | b4 | 655 | 1 min or less | — | — | 7 | X |

*Irradiation with ultraviolet rays was not carried out in the production of the pressure-sensitive adhesive sheets.

Industrial Applicability

The pressure-sensitive adhesive composition of the present invention is usable as a one-pack type composition and excellent in storage stability and, furthermore, requires no step such as for heating and aging when it is used. The cured product of the composition has excellent adhesion strength and holding power and has substantially no odor. The composition is very suitable for pressure-sensitive adhesive sheets and other uses that require especially strong holding power and should be kept away from residual odor.

What is claimed is:

1. An active energy beam-curable, pressure-sensitive adhesive sheet, which comprises a substrate and an adhesive layer formed thereon by crosslinking and curing a coat comprising an active energy beam-curable, pressure-sensitive adhesive composition by exposure to an active energy beam, wherein said active energy beam-curable, pressure-sensitive adhesive composition comprises a copolymer of copolymerizable monomers comprising:

(a) 0.1–30% by weight of an imide (meth)acrylate represented by the following formula (1),

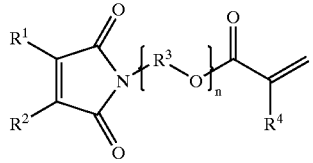

(1)

wherein $R^1$ and $R^2$ each independently represents a hydrogen atom or an alkyl group of 4 or less carbon atoms, one of $R^1$ and $R^2$ represents a hydrogen atom whilst the other is an alkyl group of 4 or less carbon atoms, or $R^1$ and $R^2$ are bonded to each other to form a carbon ring; $R^3$ is an alkylene group of 1–6 carbon atoms; $R^4$ represents a hydrogen atom or a methyl group; and n is an integer of 1–6; and (b) 70–99.9% by weight of a monomer containing an ethylenically unsaturated group.

2. An active energy beam-curable, pressure-sensitive adhesive sheet according to claim 1, wherein the monomers comprise 0.1–30% by weight of the imide (meth)acrylate, 70–99.9% by weight of an alkyl (meth)acrylate having an alkyl group of 4–12 carbon atoms, and optionally 0–50% by weight of another monomer copolymerizable with the above monomers.

3. An active energy beam-curable, pressure-sensitive adhesive sheet according to claim 2, wherein the copolymer is comprised of monomer units based on monomers comprising 0.1–3% by weight of the imide (meth)acrylate, 97–99.9% by weight of an alkyl (meth)acrylate having an alkyl group of 4–12 carbon atoms, and optionally 0–50% by weight of another monomer copolymerizable with the above monomers.

4. An active energy beam-curable, pressure-sensitive adhesive sheet according to claim 1, wherein the copolymer is comprised of monomer units from 0.1–3% by weight of the imide (meth)acrylate monomer and monomer units from 97–99.9% by weight of the monomer containing an ethylenically unsaturated group.

5. A method for producing an active energy beam-curable, pressure-sensitive adhesive sheet, which comprises coating a substrate or substrates with an active energy beam-curable, pressure-sensitive adhesive composition comprises a copolymer of copolymerizable monomers that comprise:

(a) 0.1–30% by weight of an imide (meth)acrylate represented by the following formula (1),

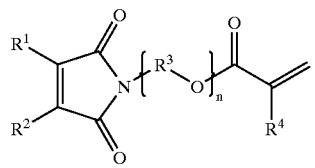

(1)

wherein the above formula (1), $R^1$ and $R^2$ each independently is a hydrogen atom or an alkyl group of 4 or less carbon atoms, one of $R^1$ and $R^2$ is a hydrogen atom whilst the other is an alkyl group of 4 or less carbon atoms, or $R^1$ and $R^2$ are bonded to each other to form a carbon ring; $R^3$ is an alkylene group of 1–6 carbon atoms; $R^4$ is a hydrogen atom or a methyl group; and n is an integer of 1–6; and (b) 70–99.9% by weight of a monomer containing an ethylenically unsaturated group, and irradiating the coating with an active energy beam.

6. A method according to claim 5, wherein said copolymerizable monomers comprise 0.1–30% by weight of the imide (meth)acrylate, 70–99.9% by weight of an alkyl (meth)acrylate having an alkyl group of 4–12 carbon atoms, and optionally 0.50% by weight of another monomer copolymerizable with the above monomers.

* * * * *